No. 608,307. Patented Aug. 2, 1898.
C. P. STEINMETZ.
ELECTRICAL DISTRIBUTION.
(Application filed July 14, 1894.)
(No Model.) 4 Sheets—Sheet 1.
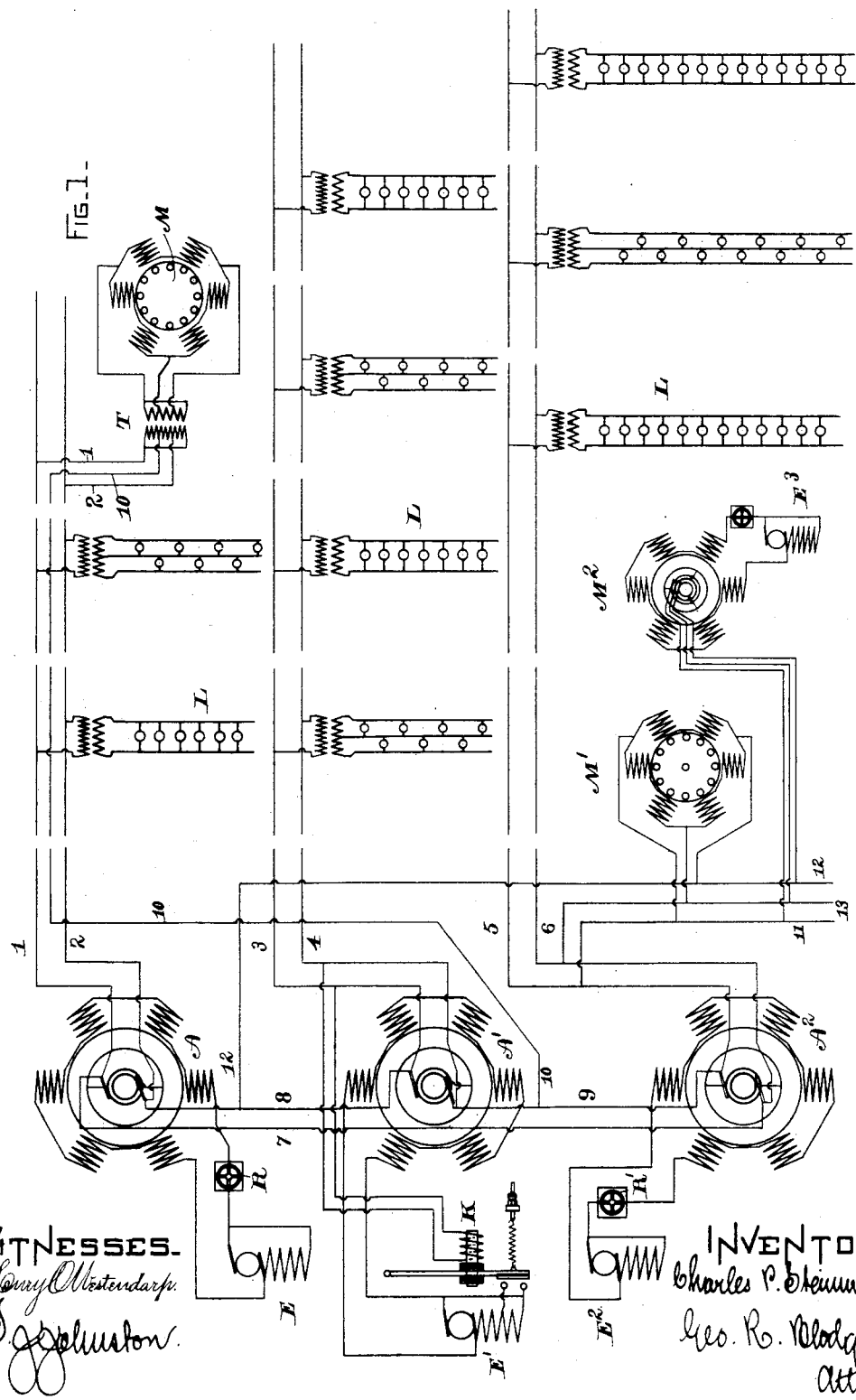

No. 608,307. Patented Aug. 2, 1898.
C. P. STEINMETZ.
ELECTRICAL DISTRIBUTION.
(Application filed July 14, 1894.)
(No Model.) 4 Sheets—Sheet 2.
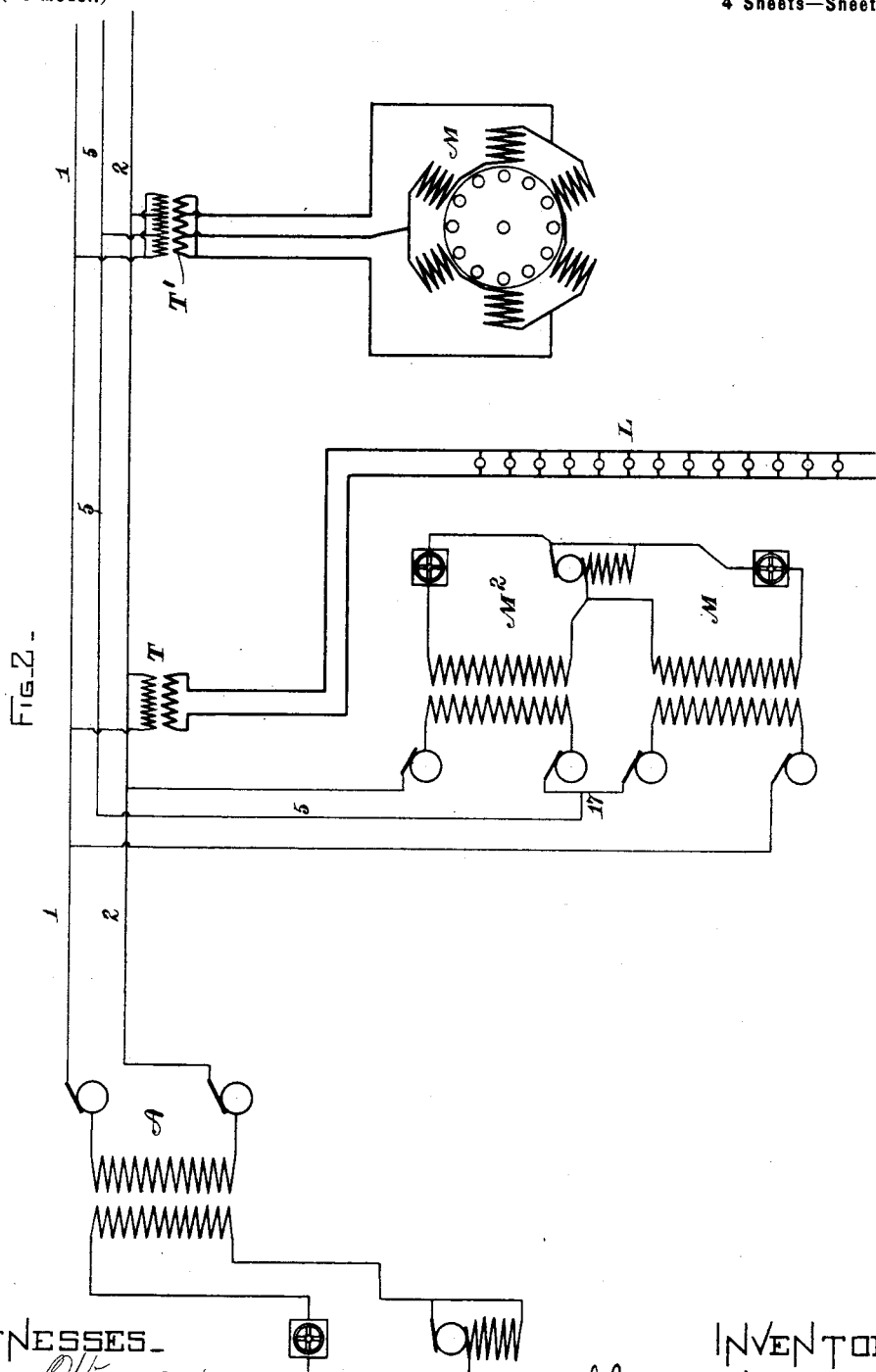

No. 608,307. Patented Aug. 2, 1898.
C. P. STEINMETZ.
ELECTRICAL DISTRIBUTION.
(Application filed July 14, 1894.)
(No Model.) 4 Sheets—Sheet 3.
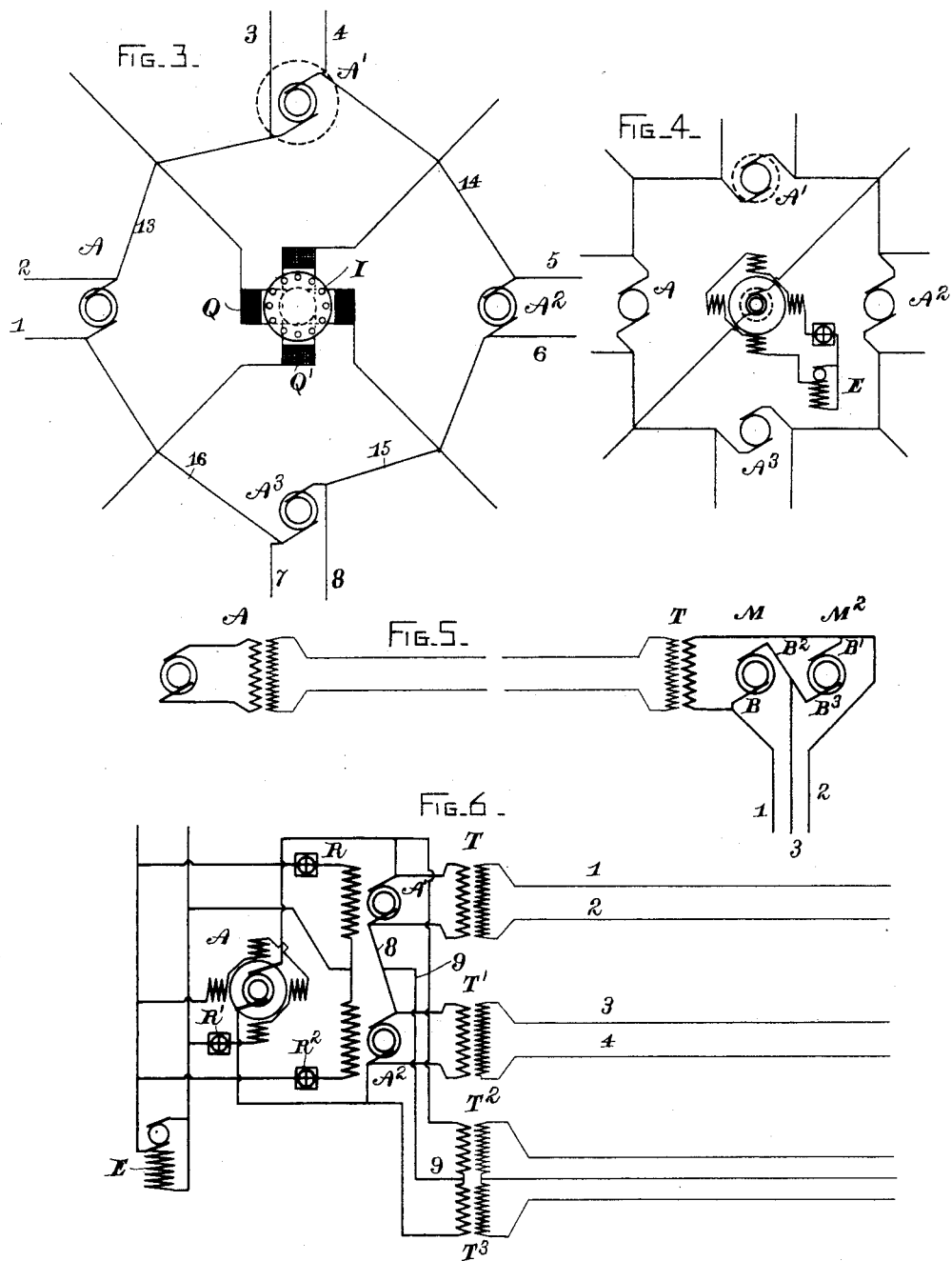

No. 608,307.   
C. P. STEINMETZ.  
ELECTRICAL DISTRIBUTION.  
(Application filed July 14, 1894.)  
Patented Aug. 2, 1898.
(No Model.)  4 Sheets—Sheet 4.
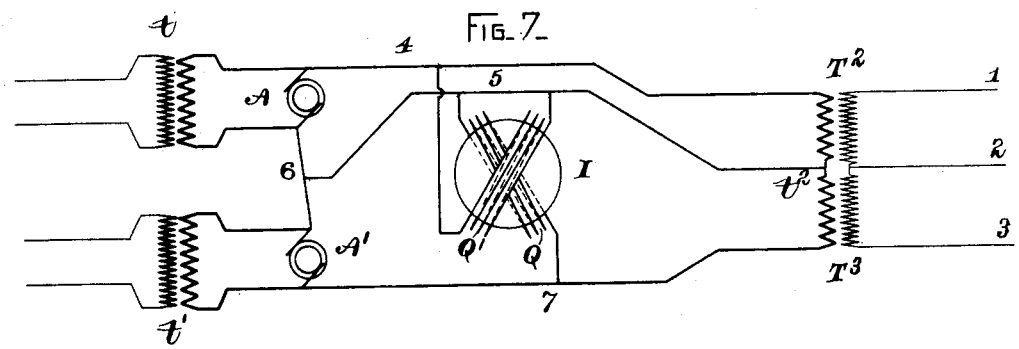
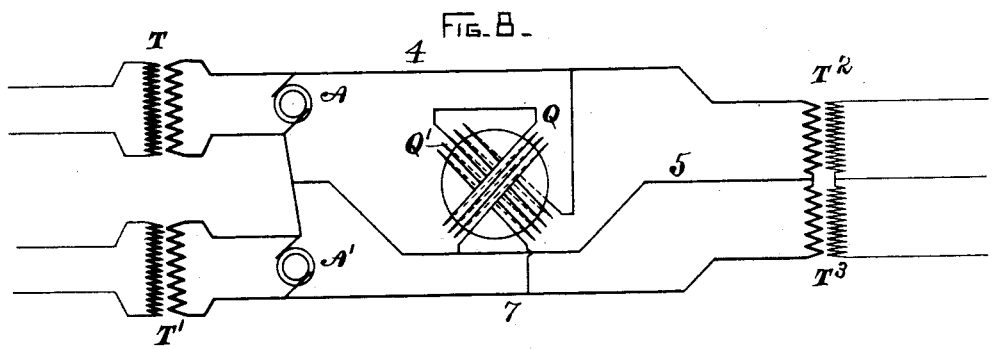
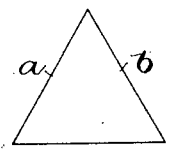  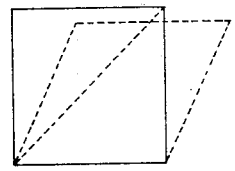
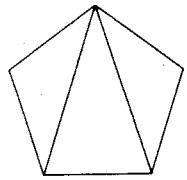 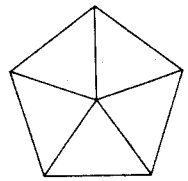
WITNESSES  
INVENTOR  
Charles P. Steinmetz  
by Geo. R. Blodgett,  
Atty

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

ELECTRICAL DISTRIBUTION.

SPECIFICATION forming part of Letters Patent No. 608,307, dated August 2, 1898.

Application filed July 14, 1894. Serial No. 517,558. (No model.)

*To all whom it may concern:*

Be it known that I, CHARLES P. STEINMETZ, a subject of the Emperor of Germany, residing at Schenectady, in the county of Schenectady, State of New York, have invented a certain new and useful Improvement in Systems of Electrical Distribution, of which the following is a specification.

The present invention relates to a system of electrical distribution and comprises certain improvements by which it is possible to obtain polyphase currents for operating polyphase motors or other translating devices by interlinking a number of sources of alternating electromotive forces in such a manner that a desired difference of phase is maintained between the different machines, which difference of phase is stable.

When a number of alternating electromotive forces are maintained in a closed circuit by independently-driven generating-machines, the sum of all of the electromotive forces must be zero, and, representing the forces geometrically, all the electromotive forces must combine to form a closed polygon. The fundamental feature of the present invention consists in interlinking a number of alternating electromotive forces derived from independently-driven machines in such manner that the polygon thereby established, as above explained, must remain stable, the electromotive forces being able to arrange themselves only in a definite position. For example, if three ordinary independently-driven alternating-current machines are connected in series and the three alternating forces assumed to be equal, then these alternating forces will be represented geometrically by three lines of equal length and such lines can combine to form only an equilateral triangle. Thus when three machines are coupled in this manner the resultant electromotive forces will be displaced in phase by one hundred and twenty degrees, which permits of a derivation of true three-phase currents from the three leads connecting the brushes of the different machines. In this instance the polygon is determined by having given the three sides necessary to fix the triangle, which represents the combined electromotive forces. If the voltage of the different machines is equal, the triangle formed, as already stated, will be equilateral and three-phase currents may be obtained from the machines. If quarter-phase currents are desired, the voltage of the machines will be so proportioned that one is substantially 1.40 times that of the other two, the other two being equal to one another. If currents sixty degrees apart are desired, these can be secured by making the voltage of one machine substantially 1.73 times that of each of the other two.

When dealing with two electromotive forces, the relation in which they will combine is fixed by having given two sides and the intermediate angle of the resulting triangle. Hence if two sources of alternating electromotive forces are used and an induction-motor in the manner hereinafter described, preserving the angle between the electromotive forces, substantially the same results may be secured in this modified manner. If the two sources were independently driven and connected in series directly without the interposition of a phase-controlling device, such as the generator or the induction-motor aforesaid, the said forces would neutralize one another's action—that is, they would come to stable equilibrium when one hundred and eighty degrees apart.

When more than three electromotive forces are combined—as, for example, four—it is impossible to fix the polygon which they will constitute by having given simply the sides of the polygon, for it will be readily understood that four lines may combine to form an indefinite number of polygons, and so, too, of other polygons except triangles. If four machines are used, it becomes necessary, therefore, to fix the polygon which they will constitute by the presence of other factors. This may be done by using another machine fixing the diagonal of the polygon or it may be accomplished by an induction-motor which determines the angle between the diagonals. These different methods of practicing the invention will be more specifically set forth hereinafter; but it will appear from the foregoing that the invention consists in combining the electromotive forces in such manner that a definite polygon of forces is formed, whereby currents may be derived for operating translating devices having a definite displacement of phase.

Of course when two or more sources of alternating electromotive force are mechanically connected together the relation of their phases is determined by their mechanical connection. My invention therefore comes into application where the said sources are not rigidly connected mechanically together, but are free to set themselves in relative phasal positions determined by the mutual reaction of their currents and fields. It will be seen that the invention comprises as an element a triangle of forces consisting of three sources of alternating electromotive force or counter electromotive force connected together in closed circuit, which by their mutual reaction assume a definite phase relation to one another and form a stable system. In the case of a larger number of forces connected in closed circuit stability is given by dividing the resulting polygon of forces into triangles of forces.

An important feature of the invention is that when two or more sources of single-phase alternating electromotive force are connected together in the manner described each of said sources may independently supply single-phase alternating circuits in addition to its function of supplying polyphase currents in conjunction with the other source or sources. In that case the single-phase mains may or may not constitute a part of the polyphase system.

In the accompanying drawings, Figure 1 is a diagram of a system of electric supply and distribution embodying my invention, showing three single-phase generators each supplying a single-phase alternating circuit and operating in conjunction to supply polyphase currents to a part of the system. Fig. 2 is a diagram of a system wherein sources of counter electromotive force are used in part in place of generators. Fig. 3 is a diagram showing the connections of four sources of alternating electromotive force with a phase-controller connected to the junction of said forces and determining the relative phases thereof. Fig. 4 is a similar diagram showing the use of a generator as a phase-controller. Fig. 5 is a diagram showing the interposition of a transformer in the circuit, the arrangement being otherwise similar to that of Fig. 2. Fig. 6 is a diagram of another arrangement of the system, in which two machines feed independent circuits and a third machine assists in feeding such circuits and at the same time acts as a phase-controller for the other machines. Figs. 7 and 8 are diagrams showing the application of the induction-motor to a system having but two generators. Figs. 9 to 13 represent geometrically the relation of the electromotive forces in systems embodying my invention.

I will first explain the general theory of my invention in connection with Figs. 9 to 13.

When three sources of alternating electromotive force generated by independently-driven machines are connected in closed circuit, we may represent the conditions in such circuit by a triangle whose sides are proportional in length to the magnitude of the corresponding electromotive forces and correspond in direction to the phases of such electromotive forces. Thus Fig. 9 may represent the conditions in a circuit having three such generators of equal electromotive force. The triangle of forces thus formed is therefore an equilateral triangle, and the sides and their corresponding electromotive forces are displaced by an angle of one hundred and twenty degrees. Again, in Fig. 10 the sides are taken proportionally to three electromotive forces in closed circuit, said forces being so proportioned that one is substantially 1.4 times that of the other two, which are equal to one another. This makes the two latter forces ninety degrees apart. So in any triangle representing three forces in closed circuit we can fix the angular displacement of the sides of the triangle, and therefore the relative phases of the corresponding forces, by properly proportioning the sides of the triangle—that is, the magnitude of such forces.

When four electromotive forces are connected in closed circuit, then, as indicated in Fig. 11, the condition of fixing the magnitudes of the electromotive forces evidently does not at the same time and of itself fix the relative phases; but if we add the additional condition of fixing the length of one of the diagonals the angles between the sides at once become fixed and definite. So in Fig. 12 by fixing the length of two diagonals of a five-sided system we get a stable arrangement. In fact, this procedure simply consists of splitting up the polygon into triangles, which are themselves necessarily stable.

In place of the above procedure we may limit the angles of one or more of the diagonals of the polygon. Thus in the case of the triangle in Fig. 9 we can suppose the sides $a\ b$ to be of given length by condition and the third side to contain an induction-motor which fixes the angle between this third side and the two given sides. So, also, in Fig. 13 we may fix the relative angles of the sides of the five-sided figure by means of an induction-motor having coils arranged so as to be responsive to the phases on said sides, as hereinafter explained.

Referring now to the application of my invention, A A' A², Fig. 1, represent three independently-driven alternating-current generators of the single-phase type feeding incandescent lamps L L L, &c., in multiple or multiple series through transformers connected between the circuits 1 2, 3 4, and 5 6, leading from the respective generators. Said generators have their field-magnets excited from any source of continuous currents, as from separate exciters E E' E², and are independently regulable at R R' or automatically regulable, as by a magnet K, responsive to the potential across the mains and acting to maintain or increase the electromotive force when the current increases.

7, 8, and 9 represent the conductors which connect the machines A A' A² in series according to my invention, and between these conductors I may obtain three-phase currents for the operation of multiphase motors.

At M is a multiphase induction-motor fed by a three-phase transformer T, suitably connected between the mains 1, 2, and 10. The main 10 leads from the connection 9 between the machines A' A²—that is, the mains 1, 2, and 10 are leads taken from the connections 7, 8, and 9. In the same manner M' represents a multiphase induction-motor, and M² a multiphase synchronous motor, the latter having a separate exciter E³ and being supplied with three-phase currents without transformation between the leads 11 12 13, which are branches from the mains 5 6 and the main 12, leading to the connection 8 between the machines A A'. It is thus easily possible to employ a number of single-phase alternating-current generators while in ordinary use in a station to obtain multiphase currents, such as three-phase currents, for the operation of multiphase motors upon the system without the use of special apparatus, it being only required to make the connections 7, 8, and 9 indicated and run a third circuit or conductor, such as 10 or 12, connected properly, as shown. It is not necessary to have three generators in a station to obtain such polyphase currents, for, as shown in Fig. 2, two synchronous alternating-current motors M and M² may have their armatures connected in series directly by the brushes, as shown, or through transformers between the mains 1 2 going from the station and a third circuit 5 led to the connection 17 between the motors. By proper excitation of these synchronous motors they can be made to change the phase relation of the potentials on the leads 1 2 from one hundred and eighty degrees to one hundred and twenty degrees and supply the intermediate main with a potential one hundred and twenty degrees from that of each of the lines 1 and 2. This connection permits me to obtain true three-phase currents between the mains 1, 5, and 2, and such an arrangement has an advantage over that shown in Fig. 1 in that but two conductors need to be led to the place of distribution, and from a connection between two alternating-current motors in series, as shown, may be led a third conductor 5, going to the multiphase motors of the system. These motors can of course be used to supply power or may be rotary transformers in addition to their use as specially-connected apparatus for obtaining multiphase currents. The motors M M² must of course be brought up to synchronous speed by any suitable starting apparatus, as in the case of any single-phase motor. The incandescent lights L will be connected between the mains 1 2, as the potential on their terminals can be maintained constant by varying the generated potential at the station A, while the multiphase motors, as M, in circuit with the transformer T' will be supplied from all three circuits.

In Fig. 5 are shown two motors connected in series between the terminals of the secondary of a transformer T, and three leads are taken therefrom, a lead 1 from the brush B, a lead 2 from the brush B', and a lead 3 from a connection joining the brushes B² B³. The three machines A M M² have the same relation as do the generators A A' A², Fig. 1, or the machines A M M², Fig. 2, in that they are connected in series; but in the present instance there is an intermediate transformation, or, in other words, the series connection of the three machines is effected indirectly through a transformer. This arrangement enables me to obtain three currents between the leads 1, 3, and 2, and of course these currents have the potential of the secondary of the transformer T and therefore are available for supplying multiphase currents to motors in a limited area, as in a factory or block.

In Fig. 6 a modified arrangement of generators for obtaining both single-phase and multiphase currents is shown. The generator A delivers currents having a potential the same as that of the machines A' and A². The generator A' feeds a transformer T, generator A² a transformer T', and the generator A feeds both transformers in series and thus supplies energy to both circuits 1 2 3 4, while the machines A' A² feed said circuits independently and may therefore be independently regulated to maintain the desired potential of the generated currents in said circuits. Each generator has its field-magnets excited from any suitable source of current E, independently regulable at R R' R². The transformers T and T' of course deliver single-phase currents to the mains 1 2 3 4 for incandescent lights. Multiphase currents for the operation of motors are obtainable from the two transformers T² T³, whose primary windings are in series and their free terminals connected to the brushes of the machine A, while conductor 9 leads from the common joint of these transformers to the conductor 8, uniting the machines A' A². It may be stated that the two generators A' A² could not be connected in series without the generator A in this circuit, as the one machine would soon entirely neutralize the action of the other; but the connection of the third generator A in the manner shown prevents this effect by maintaining the potential on the terminals of the machines A' A².

To obtain quarter-phase currents—that is, two currents differing by ninety degrees in time period—I have devised the arrangements shown in Figs. 3 and 4. It is not possible to connect two or four independently-running similar alternating-current generators in series unless some means are provided to prevent their changing their mutual phase relation. Such means are herein provided, as follows: A A' A² A³, Fig. 3, represent four alternating-current generators connected in series, as indicated, each having, if desired, its own independent circuit 1 2, 3 4, 5 6, and 7 8. 1 is an induction-motor having a coil Q connected between the conductors 13 15, joining the machines A A' A² A³, respectively, and another coil Q', at right angles thereto, connected between the conductors 14 16, joining the machines A' A² A³ A, respectively. Within the influence of these coils is mounted a closed-circuited armature, such as is used with an induction-motor. This induction-motor, connected as described, establishes the phase relations of the four generators A A' A² A³. The coils Q Q' being similar in every respect and placed at an angle of ninety degrees, as shown, the effect will be to maintain a quarter-phase relation between the said generators, and any departure from this relation will be counteracted by said induction-motor. The coils Q Q' are, as shown, set at right angles and are of an equal number of turns. Hence the counter electromotive forces developed in these coils will be at right angles and equal in value, thereby determining the polygon of electromotive forces by the value and angle of the two diagonals. This motor also serves at the same time to distribute the load of the generators—that is, if the load on one generator is in excess of that on the other a certain amount of energy will be transferred through the induction-motor to compensate to some extent for this difference of load. Fig. 13 may exemplify the application of the same principle to five generators connected in closed circuit. An induction-motor having five inducing-coils is connected, respectively, to the junctions of said generators, the other terminals of the coils leading to a common connection. These coils will by their mutual reaction through the rotary core of the induction-motor establish the relative phases on the several sides of the circuit.

In Fig. 4, as shown, the four generators may be maintained in staple equilibrium in closed circuit by means of a fifth generator placed in the diagonal of the polygon of which said four generators form the sides. Here the length of each side of the polygon and the length of the diagonal may be taken as proportional to the electromotive forces of the corresponding generators. The said lengths being definite, the resulting polygon is definite and stable.

Fig. 7 shows how two alternating-current generators may be connected in series by means of another machine having the function of the machine I in Fig. 3. Thus in Fig. 7, A and A' are two alternators having, it may be, their own independent circuits at $t$, $t'$, and $t^2$, arranged to supply currents of different phase between the mains 1 2 3. A coil Q on the machine is connected between the conductor 7 and the conductor 5, the latter being the intermediate conductor leading from the lead 6, between the two machines A A', to the junction of the primaries of the transformers T² and T³. Another coil Q', connected between the conductor 4 and the intermediate conductor 5, is placed at such an angle with relation to the coil Q as corresponds to the desired displacement of the phase of the two currents. Within the influence of the coils Q Q' is placed the revolving magnetic structure or armature I. The coils Q Q' will establish the phase relations on the several sides of the circuit by reason of their mutual reaction through the medium of the armature I, which acts a rotor of an induction-motor.

In Fig. 8 I show an arrangement whereby the coils Q and Q' are at right angles to each other or displaced ninety degrees, and the phases of the currents from the machines A and A' will therefore also differ by ninety degrees—that is, they will be quarter-phase currents and be supplied to a system through transformers T² and T³, as before, while each machine may likewise have its own individual circuit, as T T', and be independently regulated. The winding of the coils Q and Q' may be modified if their angular displacement is maintained. Thus in Fig. 8 the coil Q' has its terminals connected to the outer mains 4 and 7, while from its center connection is made to the middle conductor 5 through the coil Q. Any extra energy or rise of potential in either half of the coil Q' coming from either machine A A' will be instantly transferred inductively to the inner revolving magnetic structure or armature and by it carried to the coil Q and delivered between the machines A A', thus dividing the energy between the two machines and maintaining a phasal difference between the generated currents corresponding, as before, to the displacement of the coils Q Q'.

In a divisional application, Serial No. 637,658, filed May 22, 1897, I have made certain claims more especially directed to that feature of my invention illustrated in one form in Figs. 2 and 5 of the present application, which consists in generating single-phase current, transmitting it to a distant point, and generating two separate electromotive forces by machines free to adjust themselves to any desired phase relation with the original current and maintaining by the mutual reactions a polyphase relation between the electromotive forces of the system. I have also made in the said divisional application claims directed specifically to that form of my invention in which one or more of the three or more sources of electromotive forces connected in series are motors. In the present application I intend to make generic claims covering all the forms shown, and also more specific claims more particularly directed to forms other than those shown in Figs. 2 and 5.

What I claim as new, and desire to secure by Letters Patent of the United States, is—

1. The method of supplying polyphase current from a plurality of windings, whose phase relation is otherwise undetermined, which consists in so connecting the windings that their mutual reactions will establish and maintain a polyphase relation between the electromotive forces generated therein, and carrying current from a plurality of said windings to feed a polyphase translating device.

2. The method of generating polyphase currents, which consists in running the main windings of a plurality of single-phase alternating-current dynamo-electric machines, of which one at least is a generator, on a closed circuit, causing the reactions between the machines to displace the phases of the different electromotive forces, and delivering current from a plurality of said machines to a translating device.

3. The method of obtaining polyphase currents, which consists in generating a plurality of single-phase electromotive forces by sources each of which is free to arrange itself in any desired phasal relation with the other sources, causing the mutual reactions of the sources, by reason of their electrical interconnection, to maintain a polyphase relation between the said electromotive forces, and conveying current from said sources to a distribution system.

4. The method of maintaining a desired phase relation between a plurality of single-phase alternating-current dynamo-electric machines, otherwise free to arrange themselves in any phase relation whatever, which consists in causing the counter electromotive force of an alternating-current motor to react upon a closed circuit containing said machines, in such a way as to control their phasal relations.

5. The herein-described method of obtaining three-phase currents, which consists in connecting in series three single-phase alternating generators, and deriving three-phase currents from mains taken from points between said generators.

6. The combination with a plurality of sources of alternating electromotive force connected in series, of one or more branch circuits, each containing a source of alternating electromotive force, connected across intermediate points of the circuit joining said first-named sources, so as to divide the polygon of electromotive forces into triangles of electromotive forces, and to fix the phase relations.

7. The combination of a plurality of independently-driven single-phase alternating generators, connected in closed circuit, mains leading from connections between said generators, and polyphase translating devices supplied by said mains.

8. The combination of a plurality of independently-driven single-phase alternating generators, connections interlinking said generators in closed circuit, and determining the relative phases of the same, mains leading from said connections, and polyphase translating devices supplied by said mains.

9. The combination of a plurality of sources of single-phase alternating electromotive force, connected in closed circuit, mains connected to said sources, and polyphase translating devices connected to three or more of said mains.

10. The combination of a plurality of alternating-current dynamo-electric machines, greater in number than two, connected in a closed circuit, one at least of such machines being a generator of electrical energy, and polyphase mains connected to the junctions of said machines.

11. The combination of three alternating-current dynamo-electric machines connected in closed circuit, one at least of such machines being a generator of electrical energy, and polyphase mains connected to the junctions of such machines.

12. The combination of three single-phase alternating generators, connected in closed circuit, mains and translating devices supplied by one or more of such machines acting individually, and polyphase translating devices supplied by all of such machines acting collectively.

13. The combination of sources of a plurality of alternating electromotive forces free to arrange themselves in relative phasal relation, and electrical connections interlinking such sources in a closed circuit, and polyphase mains leading from said circuit to a distribution system, the number of the electromotive forces and the manner in which they are interlinked being such that said electromotive forces can combine only in a fixed and stable phasal relation, and preserve a desired polyphase relation between the electromotive forces at different positions of the connecting closed circuit.

14. The combination of a plurality of single-phase alternating generators, mains leading from the terminals of one or more of said generators, translating devices between such mains, connections between such generators interlinking them in closed circuit, mains leading from such connections, and polyphase translating devices between mains leading from three or more different portions of said closed circuit.

15. The combination of a plurality of alternating-current dynamo-machines, capable of running independently, greater in number than two, and connected in a closed circuit, and leads from a plurality of intermediate points of said circuit to a translating device.

16. The combination of three or more dynamo-electric machines of the alternating-current type, capable of running independently, and connected in a closed circuit in such a way that their mutual reactions cause their electromotive forces to combine in a fixed and stable phasal relation, and to preserve a desired polyphase relation between different points of the closed circuit, and connections leading from intermediate points to a multiphase distribution system.

17. The combination with four or more sources of alternating electromotive force connected in a closed circuit, of one or more additional sources of alternating electromotive force connected across said circuit at such points that each two of the original sources is in series with one of the additional sources, whereby the polygon of electromotive force formed by the original sources is divided into triangles of electromotive force.

In witness whereof I have hereunto set my hand this 10th day of July, 1894.

CHARLES P. STEINMETZ.

Witnesses:
A. F. MACDONALD,
B. B. HULL.